(12) United States Patent
Becker et al.

(10) Patent No.: US 7,573,370 B2
(45) Date of Patent: Aug. 11, 2009

(54) METHOD AND DEVICE FOR STORING AND DISTRIBUTING INFORMATION IN AN RFID TAG

(75) Inventors: Robert C. Becker, Eden Prairie, MN (US); David W. Meyers, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 412 days.

(21) Appl. No.: 10/235,899

(22) Filed: Sep. 5, 2002

(65) Prior Publication Data

US 2004/0046643 A1 Mar. 11, 2004

(51) Int. Cl.
*H04Q 5/22* (2006.01)

(52) U.S. Cl. .............. 340/10.41; 340/10.1; 340/10.31

(58) Field of Classification Search .............. 340/10.41, 340/572.1, 870.2, 10.43, 10.31, 10, 1
See application file for complete search history.

(56) References Cited

U.S. PATENT DOCUMENTS

| | | | |
|---|---|---|---|
| 5,055,659 A * | 10/1991 | Hendrick et al. ......... 340/10.51 |
| 5,151,684 A | 9/1992 | Johnsen |
| 5,305,199 A | 4/1994 | LoBiondo et al. |
| 5,319,544 A | 6/1994 | Schmerer et al. |
| 5,376,778 A | 12/1994 | Kreft |
| 5,448,110 A * | 9/1995 | Tuttle et al. .................. 257/723 |
| 5,469,142 A | 11/1995 | Bergman et al. |
| 5,533,079 A | 7/1996 | Colburn et al. |
| 5,671,362 A | 9/1997 | Cowe et al. |
| 5,741,985 A | 4/1998 | Gaete |
| 5,777,884 A | 7/1998 | Belka et al. |
| 5,781,004 A | 7/1998 | Gaete |
| 5,841,770 A | 11/1998 | Snodgrass et al. |
| 5,949,335 A | 9/1999 | Maynard |
| 5,962,834 A | 10/1999 | Markman |
| 5,995,898 A * | 11/1999 | Tuttle .......................... 701/102 |
| 6,034,603 A | 3/2000 | Steeves |
| 6,050,490 A | 4/2000 | Leichner et al. |

(Continued)

FOREIGN PATENT DOCUMENTS

DE 198 55 596 A1 6/2000

(Continued)

OTHER PUBLICATIONS

International Search Report for PCT/US03/27823 completed Jan. 27, 2004.*

(Continued)

*Primary Examiner*—Edwin C Holloway, III
(74) *Attorney, Agent, or Firm*—Schiff Hardin LLP

(57) ABSTRACT

An RFID tag has a memory, an RF transceiver that supports long range RF communications with a long range reader, and an interface that supports short range communications with a short range reader over a secure link. The RF transceiver can be used to transmit an ID stored in the memory of the tag to a long range reader, and the interface can be used to transmit sensitive history information to a short range reader over the secure link. The ID uniquely identifies an article to which the tag is attached, and the history information provides environmental data, and/or maintenance data, and/or shipping data, and/or inventory data, and/or production data, etc. about the article.

25 Claims, 2 Drawing Sheets

U.S. PATENT DOCUMENTS

| | | | |
|---|---|---|---|
| 6,052,068 A * | 4/2000 | Price R-W et al. | 340/933 |
| 6,078,251 A | 6/2000 | Landt et al. | |
| 6,091,319 A | 7/2000 | Black et al. | |
| 6,107,910 A | 8/2000 | Nysen | |
| 6,150,948 A | 11/2000 | Watkins | |
| 6,265,963 B1 | 7/2001 | Wood, Jr. | |
| 6,317,028 B1 | 11/2001 | Valiulis | |
| 6,330,971 B1 | 12/2001 | Mabry et al. | |
| 6,337,634 B1 | 1/2002 | O'Toole et al. | |
| 6,346,884 B1 * | 2/2002 | Uozumi et al. | 340/572.1 |
| 6,351,630 B2 | 2/2002 | Wood, Jr. | |
| 6,353,406 B1 | 3/2002 | Lanzl et al. | |
| 6,362,737 B1 | 3/2002 | Rodgers et al. | |
| 6,554,187 B2 * | 4/2003 | Otto | 235/383 |

FOREIGN PATENT DOCUMENTS

| | | | |
|---|---|---|---|
| EP | 0 534 559 A1 | | 3/1993 |
| FR | 2 703 171 | | 9/1994 |
| GB | 2308947 | * | 9/1997 |
| WO | WO 99/17230 | | 4/1999 |
| WO | WO 99/45761 | | 9/1999 |
| WO | WO 01/03062 A1 | | 1/2001 |

OTHER PUBLICATIONS

European Search Report for EP 03 75 4450 completed Dec. 20, 2005.*

* cited by examiner

METHOD AND DEVICE FOR STORING AND DISTRIBUTING INFORMATION IN AN RFID TAG

TECHNICAL FIELD OF THE INVENTION

The present invention relates to a tag that can be suitably attached to an article and that can store information about the article to which it is attached.

BACKGROUND OF THE INVENTION

Various labels have been attached to articles so that the articles can be distinguished one from the other. For example, bar code labels are attached to articles of grocery and are scanned at a check-out counter in order to automatically identify the articles and to register the price of the articles as they are purchased.

Bar code labels have also been used in inventory control and monitoring. Accordingly, these bar codes may be scanned in order to track articles as they move into, through, and out of a storage area. It is also known to read the bar codes attached to the articles in order to access various computer records regarding the articles.

Bar code labels, however, have several drawbacks. For example, computer stored records that are accessed when a bar code is read do not move with the corresponding article. Therefore, if the article to which the bar code label is attached is remote from the computer, the records concerning that article cannot be immediately accessed if necessary.

Moreover, bar code labels cannot be read remotely. Thus, if it is desired to take an inventory of articles currently in the storage area, personnel must physically scan each label on each article one at a time in order to determine which articles are presently in the storage area. Such scanning requires the physical presence of the personnel at the location of the articles and is extremely time consuming. Additionally, because bar code labels cannot be read remotely, they cannot be used as security devices that can be detected if the articles to which they are attached are improperly removed from a secured area.

It is known to provide pallets, on which articles are stored, with a memory storage device. The memory storage device may then be used to retain inventory information about the components that make up the articles. The memory storage device can also retain the results of production steps, such as tests, that are performed on the articles. The pallet may be provided with a read and write terminal so that the information contained within the memory storage device can be read and so that information can be written for storage in the memory storage device.

Similarly, it is known to provide an RFID tag, having a memory storage device, on a cassette that holds semiconductor wafers. The memory storage device of the RFID tag may then be used to store pages of information including a factory ID number, a cassette ID code, a lot ID, a plant order number, the current operation and the next operation, a current quantity (i.e., the wafer count), the total cassette loops in lifetime, the cassette loops since bakeout, and an in-process flag (e.g., in-process or waiting.

Thus, records may be more closely associated with the articles. However, the records are still not stored on the articles themselves so that, if the articles are removed from the pallets or cassettes, the records regarding these articles are not easily accessed.

It is also known to attach radio frequency identification (RFID) tags to the articles themselves. The RFID tags can be read, as can bar code labels. However, unlike bar code labels, reading RFID tags does not require the physical presence of personnel because the tags can instead be read remotely. Thus, inventory can be taken more quickly because personnel are not required to walk around a storage area or other area in order to read the tags. Moreover, because RFID tags can be read remotely, they can be used as security devices. Thus, if someone attempts to surreptitiously remove an article to which an RFID tag is attached from a secured area, a remote reader can sense the tag and provide an appropriate alarm.

It has been known to use RFID tags in combination with computers to which the RFID tags are attached. Such RFID tags store a unique identification (e.g., a manufacturing site code and a serial number) for the computer, a description of the computer (e.g., model number, serial number, and date of manufacture), and security data related to the computer (e.g., a removal authorization and a predetermined communications sequence). These RFID tags, however, rely on the host computer for the transfer and storing of data.

Furthermore, transceivers, such as RFID tags, have been attached to the articles themselves and have included sensors for sensing environmental conditions that may affect the corresponding articles. A memory of the transceiver stores the environmental conditions sensed by the sensors. However, these tags store little other information.

Thus, none of the RFID tags used in the past have been capable of storing accurate information relating to the history of the goods to which the RFID tags are attached. For example, known RFID tags do not store information about the inventory history, shipping manifests, and maintenance related to the corresponding articles. Moreover, both a non-secure link and a secure link are not provided to read known tags. For example, while it is often useful to use a long range RF reader (i.e., a non-secure link) to read the ID stored in the RFID tag, and thereby verify the presence of the RFID tag and presumably the item to which it is attached, it is may not be desirable to use the long range reader to read other information stored in the tag because long range transmissions are more easily intercepted.

The present invention overcomes one or more of these or other deficiencies of prior art tags.

SUMMARY OF THE INVENTION

In accordance with one aspect of the present invention, an RFID tag comprises a memory that stores data, an RF transceiver that supports long range RF communications with a long range reader, and an interface that supports short range communications with a short range reader over a secure link.

In accordance with another aspect of the present invention, a method of transmitting data stored in an RFID tag comprises the following: over a first communication link, transmitting an ID from a memory, wherein the ID identifies an article to which the RFID tag is attached, wherein the first communication link comprises a long range RF link, and wherein the RFID tag includes the memory; and, over a second communication link, transmitting history information from the memory, wherein the history information comprises information related to a history of the article, and wherein the second communication link comprises a secure short range link.

In accordance with still another aspect of the present invention, a method of transmitting data stored in a tag comprises the following: transmitting an ID from a memory, wherein the ID identifies an article to which the tag is attached, and wherein the tag includes the memory; and, transmitting history information from the memory, wherein the history information comprises maintenance information related to the maintenance history of the article.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
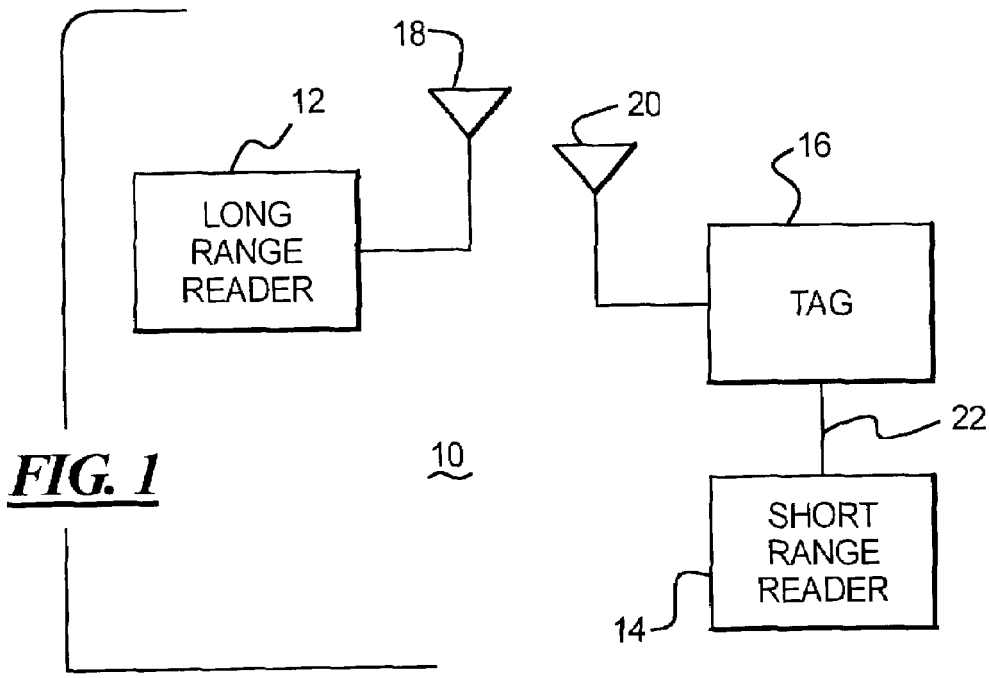
FIG. 1 illustrates a tagging system in accordance with one embodiment of the present invention.

As illustrated in FIG. 1, a tagging system 10 includes a long range reader 12, a short range reader 14, and an RFID tag 16. The long range reader 12 includes an antenna 18, and the RFID tag 16 similarly includes an antenna 20. The antennas 18 and 20 establish a long range RF link between the long range reader 12 and the RFID tag 16 so that the long range reader 12 can remotely read the identification stored in a memory of the RFID tag 16. The range of the long range reader 12 can be as high as several hundred feet. For example, the long range reader 12 can have an expected maximum range of approximately 500 feet.

A secure link 22 between the short range reader 14 and the RFID tag 16 permits the short range reader 14 to read information from the RFID tag 16 in a more secure manner. That is, it may not be desirable for the long range reader 12 to read certain information stored in the RFID tag 16 because long range RF communications can be intercepted by a strategically placed surreptitious reader similar to the long range reader 12. Accordingly, the secure link 22 increases the difficulty in illicitly acquiring the more sensitive information that may be stored on the RFID tag 16.

The secure link 22 is shown in FIG. 1 as a hard wire link between the short range reader 14 and the RFID tag 16. Accordingly, the more sensitive information stored on the RFID tag 16 can be read by establishing a physical interconnection between the short range reader 14 and the RFID tag 16. Alternatively, the secure link 22 may be a limited range magnetic link such as those provided by contact-free smart cards. As a still further alternative, the secure link 22 may be a very limited range RF link. Other alternatives will occur to those skilled in the art. The expected maximum range of the short range reader 14 over the secure link 22, for example, may be less than 2 feet, and can be between 6 inches and 18 inches.

Figure 2:
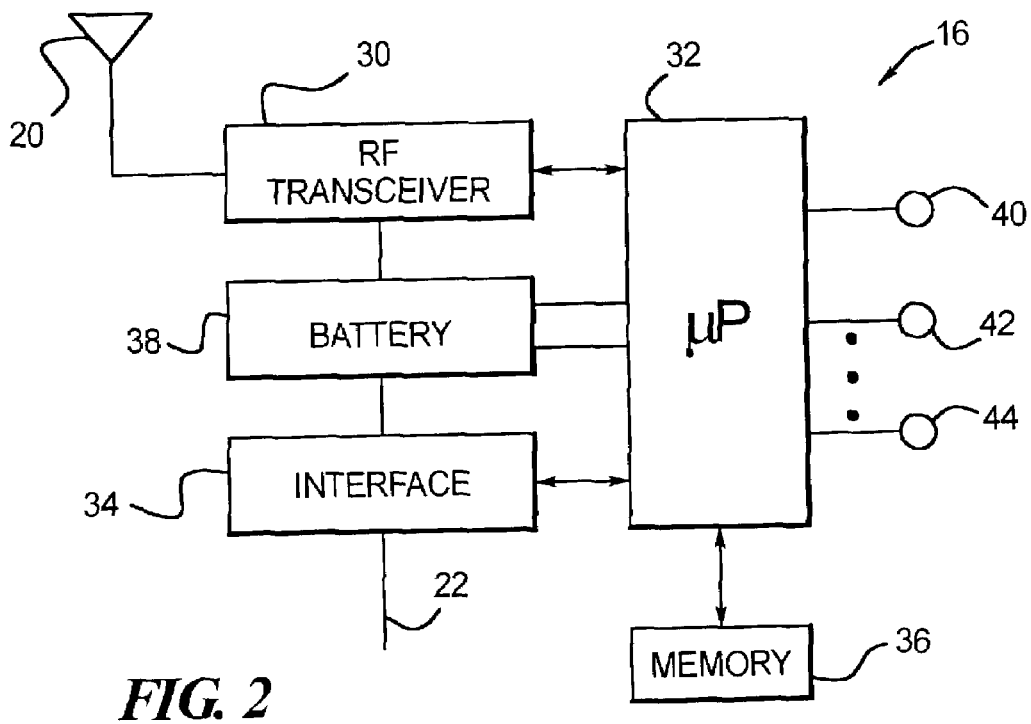
FIG. 2 illustrates additional detail of a tag that can be used with the tagging system of FIG. 1; and, FIG. 3 is a flow chart showing the operation of the tag illustrated in FIGS. 1 and 2.

An embodiment of the RFID tag 16 is shown in additional detail in FIG. 2. The RFID tag 16 includes an RF transceiver 30 coupled between the antenna 20 and a microprocessor 32. Accordingly, the RFID tag 16 can transmit and receive communications to and from the long range reader 12.

The RFID tag 16 also includes an interface 34 between the microprocessor 32 and the short range reader 14. Accordingly, the RFID tag 16 can transmit and receive communications to and from the short range reader 14. In the case where the secure link 22 is a hardwire link, the interface 34 may simply be a plug that is connectible to a corresponding plug of the short range reader 14. In the case where the secure link 22 is an RF link, the interface 34 may be an RF transceiver that is similar to the RF transceiver 30, but that preferably has a much shorter range. In the case where the secure link 22 is a magnetic link, the interface 34 may simply be a magnetic emitter/sensor capable of magnetically interfacing with the short range reader 14.

The RFID tag 16 also comprises a memory 36 coupled to the microprocessor 32. The memory 36 stores the ID of the RFID tag 16 that can be read by the long range reader 12 through the antennas 18 and 20, the RF transceiver 30, and the microprocessor 32. The memory 36 also stores information supplied to it by the short range reader 14 through the secure link 22, the interface 34, and the microprocessor 32.

This information can include, for example, the inventory history of the article to which the RFID tag 16 is attached. Accordingly, the date that the article entered inventory, the date that the article left inventory, the length of time that the article has been in inventory, any movement into and out of inventory, and similar information may be stored in the memory 36.

The information stored in the memory 36 may also include shipping manifests that indicate when and to whom the article is to be shipped. Moreover, in the case where individual articles with differing destinations are shipped in the same container, an RFID tag attached to the container, hereafter called a container tag, can be attached to the container. This container tag may be arranged to store the identity and destination of each article in the container. As articles are removed from the container, the information stored in the container tag can be updated to indicate which articles have been removed, the location at which the articles were removed, and the identity of the personnel who removed the articles.

The information stored in the memory 36 may further include maintenance, repair, and date of service records showing the maintenance and/or repair history of the corresponding article.

Other information related to the article may likewise be stored in the memory 36. For example, the integrity of the information stored in the memory 36 can be assured by keeping a record of the modifications to the stored information and of the identity of the personnel making the modifications. As another example, records related to the production of the article may be stored in the memory of the tag.

Accordingly, any information about the article may be stored with the article instead of in a remote computer system or on paper.

Because the records are carried by the RFID tag 16 attached to a corresponding article, the RFID tag 16 eliminates the need to maintain paper or computer records of the life history of an article, the RFID tag 16 eliminates the problem of lost or misplaced records, and the RFID tag 16 improves operational efficiency by eliminating the requirement to retrieve records prior to accessing and/or operating on the article.

As shown in FIG. 2, the RFID tag 16 includes a battery 38 that is coupled so that it supplies power to the RF transceiver 30, the microprocessor 32, the interface 34 (if necessary), and the memory 36.

A plurality of sensors is coupled to the microprocessor 32. These sensors include, for example, a temperature sensor 40, a humidity sensor 42, and other sensors 44 such as a pressure sensor, a proximity sensor, an electromagnetic sensor, an optical sensor, a mechanical sensor, a chemical sensor such as an aerosol chemical sensor, and/or the like. The microprocessor 32 stores the information from these sensors in the memory 36, and this information may be read from the memory 36 by the short range reader 14.

The microprocessor 32 is also coupled to sense the voltage level of the battery 38. Accordingly, the microprocessor 32 stores the voltage level of the battery 38 in the memory 36, and this information may be read from the memory 36 by the short range reader 14. Thus, if the voltage level of the battery 38 as read by the short range reader 14 indicates that the battery 38 needs charging or replacement, suitable remedial action may be taken.

Figure 3:
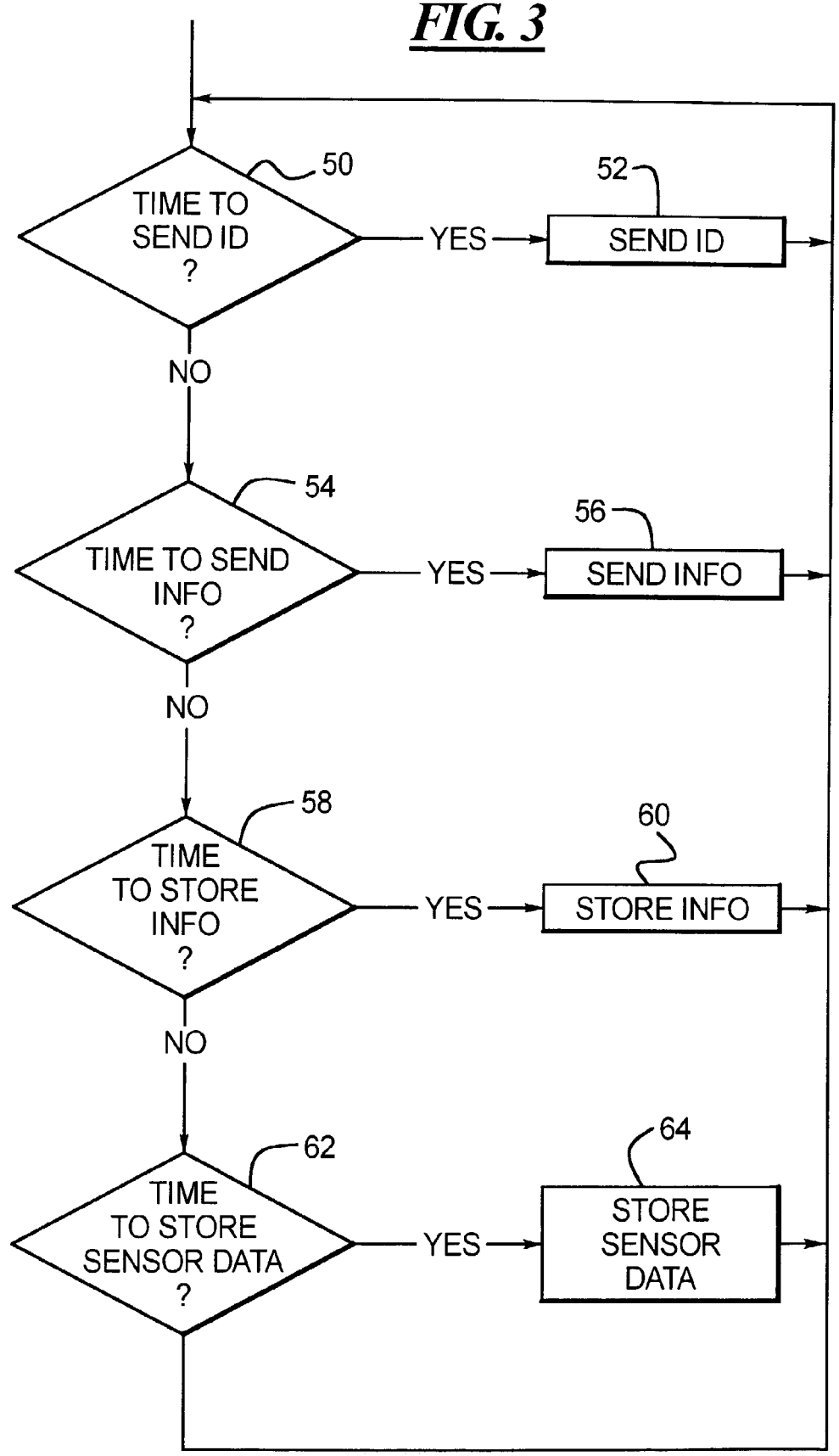

As shown in FIG. 3, if it is time for the RFID tag 16 to send its ID to the long range reader 12 as determined by a block 50, a block 52 provides the ID to the RF transceiver 30 which transmits the ID by use of the antenna 20. At the block 50, the microprocessor 32, for example, may respond to an interrupt or other signal provided by the RF transceiver 30 indicating that a polling message has been received by the RF transceiver 30 from the long range reader 12. Alternatively or additionally, the microprocessor 32 may simply respond to an interrupt or other signal provided by a timer indicating that it is time to send the tag's ID.

If it is time for the RFID tag 16 to send the information stored in the memory 36 by the short range reader 14 as determined by a block 54, a block 56 provides the information to the interface 34 which transmits the information to the secure line 22. At the block 54, the microprocessor 32, for example, may respond to an interrupt or other signal provided by the short range reader 14 over the secure link 22 indicating that the short range reader 14 is ready to read all or a selected part of the information. Alternatively or additionally, the microprocessor 32 may simply respond to an interrupt or other signal provided by a timer indicating that it is time to send all or a part of the information.

If it is time for the RFID tag 16 to store in the memory 36 the information provided by the short range reader 14 as determined by a block 58, a block 60 stores in the memory 36 the information received by the interface 34. At the block 58, the microprocessor 32, for example, may respond to an interrupt or other signal provided by the interface 34 based on a message received over the secure link 22 indicating that the short range reader 14 has information to be stored in the memory 36.

If it is time for the RFID tag 16 to store in the memory 36 sensor data provided by the sensors 40-44 as determined by a block 62, a block 64 stores in the memory 36 the sensor data received from the sensors 40-44, as appropriate. At the block 62, the microprocessor 32, for example, may respond to a timer interrupt or other signal that triggers the microprocessor 32 to periodically read the data on sensor data input terminals and to store this data in the memory 36. The microprocessor may also store in the memory 36 the time at which the sensor data are read.

Certain modifications of the present invention have been disclosed above. Other modifications will occur to those practicing in the art of the present invention. For example, the functions of the long range reader 12 as described above have been confined to reading information from the RFID tag 16. However, the long range reader 12 can also be arranged to write information to the RFID tag 16.

Moreover, although the RFID tag 16 is shown as a microprocessor based tag in FIG. 2, the RFID tag 16 may instead comprise one or more digital circuit elements, and/or a programmable logic array, and/or a dedicated integrated circuit, etc.

Furthermore, as described above, the long range reader 12 reads the ID of the RFID tag 16, and the short range reader 14 reads all other information and data stored in the memory 36 of the RFID tag 16. Alternatively or additionally, the short range reader 14 may be arranged to read the ID of the RFID tag 16, and the long range reader 12 may be arranged to read some or all of the information and data stored in the memory 36, while the secure link 22 may be used to read the more sensitive information and data from the memory 36.

Also, the long range reader 12 as described above has a range of several hundred feet and could have an expected range of approximately 500 feet. However, this range could be longer or shorter depending on the application and/or other factors. Similarly, the range given above for the short range reader 14 could be other than as described above.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of transmitting data stored in a stand-alone RFID tag comprising:

over a first communication link, transmitting an ID from a memory, wherein the ID identifies an article to which the stand-alone RFID tag is attached, wherein the first communication link comprises a long range RF link, and wherein the stand-alone RFID tag includes the memory; and, over a second communication link, transmitting date related history information from the memory, wherein the date related history information comprises information related to a date related history of the article, and wherein the second communication link comprises a secure short range link.

2. The method of claim 1 wherein the date related history information comprises a condition sensed by a sensor.

3. The method of claim 2 wherein the condition comprises temperature.

4. The method of claim 2 wherein the condition comprises humidity.

5. The method of claim 2 wherein the condition comprises proximity.

6. The method of claim 2 wherein the condition comprises a voltage level of a battery powering the stand-alone RFID tag.

7. The method of claim 1 wherein the secure short range link comprises a secure hardwire link.

8. The method of claim 1 wherein the secure short range link comprises a secure magnetic link.

9. The method of claim 1 wherein the secure short range link comprises a secure short range RF link.

10. The method of claim 1 wherein the date related history information comprises shipping information related to the article.

11. The method of claim 1 wherein the date related history information comprises inventory information related to movement of the article through inventory.

12. The method of claim 1 wherein the date related history information comprises production information related to the article.

13. The method of claim 1 wherein the date related history information comprises maintenance, repair, and date of service information related to the article.

14. A method of transmitting data stored in a tag comprising:

transmitting an ID from a memory, wherein the ID identifies an article to which the tag is attached, and wherein the tag includes the memory, and wherein the transmitting of an ID comprises transmitting the ID over a long range RF link; and, transmitting date based history information from the memory, wherein the date based history information comprises inventory information related to movement of the article through inventory, and wherein the transmitting of date based history information comprises transmitting the date based history information over a secure short range link.

15. The method of claim 14 wherein the date based history information further comprises a condition sensed by a sensor.

16. The method of claim 15 wherein the condition comprises temperature.

17. The method of claim 15 wherein the condition comprises humidity.

18. The method of claim 15 wherein the condition comprises proximity.

19. The method of claim 15 wherein the condition comprises a voltage level of a battery powering the RFID tag.

20. The method of claim 15 wherein the condition comprises a presence of a chemical.

21. The method of claim 14 wherein the secure short range link comprises a secure hardwire link.

22. The method of claim 14 wherein the secure short range link comprises a secure magnetic link.

23. The method of claim 14 wherein the secure short range link comprises a secure short range RF link.

24. The method of claim 14 wherein the date based history information further comprises shipping information related to the article, wherein the shipping information indicates when and to whom the article is to be shipped.

25. The method of claim 14 wherein the date based history information further comprises production information related to the article.

* * * * *